United States Patent [19]
Lee

[11] Patent Number: 5,893,617
[45] Date of Patent: Apr. 13, 1999

[54] CONNECTING ASSEMBLY FOR HORIZONTAL BOARDS AND WALL BOARDS OF A CABINET

[75] Inventor: Shang-Ming Lee, Taipei, Taiwan

[73] Assignee: M. F. Interior Design Co., Ltd., Taipei, Taiwan

[21] Appl. No.: 08/852,442

[22] Filed: May 7, 1997

[51] Int. Cl.[6] .................................................. A47B 47/00
[52] U.S. Cl. ................. 312/263; 312/111; 312/265.5; 108/185; 108/158.13; 403/381; 403/231
[58] Field of Search ...................... 312/263, 265.5, 312/257.1, 111; 108/180, 185, 192, 193, 158.12, 153.1; 403/381, 230, 231

[56] References Cited

U.S. PATENT DOCUMENTS

| | | | |
|---|---|---|---|
| 3,874,753 | 4/1975 | Naito et al. | 312/263 X |
| 3,977,742 | 8/1976 | Rovere | 312/111 |
| 4,021,089 | 5/1977 | Bush | 312/265.5 |
| 4,650,263 | 3/1987 | Monaghan et al. | 312/263 X |
| 5,433,416 | 7/1995 | Johnson | 403/381 X |
| 5,470,139 | 11/1995 | Hsiao | 312/111 X |
| 5,588,726 | 12/1996 | Lee | 403/231 X |

FOREIGN PATENT DOCUMENTS

| | | | |
|---|---|---|---|
| 2406405 | 5/1979 | France | 108/180 |
| 196935 | 4/1938 | Switzerland | 312/263 |
| 2241877 | 9/1991 | United Kingdom | 108/180 |

*Primary Examiner*—Peter M. Cuomo
*Assistant Examiner*—Hanh V. Tran
*Attorney, Agent, or Firm*—Bacon & Thomas, PLLC

[57] ABSTRACT

A connecting assembly for horizontal boards and wall boards of a cabinet. Each of the horizontal boards and wall boards is formed with clamping channels along lateral sides. The connecting assembly comprises upper T-blocks, lateral T-blocks, inner cross-blocks and L-shaped corner blocks each of which is formed by a vertical slat and at least one horizontal slat. One edge of the vertical slat is formed with shallow or deep dovetail notches at equal intervals. The dovetail notches have reversely inclined faces which are interlaced, or have inclined faces. The horizontal slat has corresponding dovetail tenons spaced from each other by a distance equal to or double that of the dovetail notches.

5 Claims, 6 Drawing Sheets

5,893,617

CONNECTING ASSEMBLY FOR HORIZONTAL BOARDS AND WALL BOARDS OF A CABINET

BACKGROUND OF THE INVENTION

The present invention relates to a connecting assembly for horizontal boards and wall boards of a cabinet. The connecting assembly includes unified connecting members which can be easily and quickly assembled in a working site to form the cabinet.

In a conventional knockdown cabinet, the wooden horizontal boards and wall boards are directly formed with tenons and mortises for engaging with each other so as to form a rigid cabinet. When manufacturing the cabinet boards with the tenons and mortises, in the case that the board material has too large area and too long length, a larger working table will be needed. As a result, it is difficult to work on the board material and the working efficiency is low.

In addition, in a humid place, after a period of use, the board material is subject to deformation so that the tenons and mortises often cannot snugly engaged with each other. Also, it is laborious to drill the mortise and it is quite difficult to plane the bottom of the mortise.

Moreover, the assembly of the cabinet is completed in the factory. The product has considerably large volume. Therefore, it is difficult to transfer and move the cabinet into a room.

SUMMARY OF THE INVENTION

In order to solve the above problems, it is a primary object of the present invention to provide a connecting assembly for horizontal boards and wall boards of a cabinet. The connecting assembly includes unified connecting members which can be transferred in a disassembled state and easily and quickly assembled in a working site to form the cabinet.

It is a further object of the present invention to provide the above connecting assembly in which the connecting unit is formed by a vertical slat and at least one horizontal slat inserted therewith. The connecting units can be freely assembled according to the dimension of the board material and the space. Also, the connecting units can be mass-produced to reduce manufacturing cost.

It is still a further object of the present invention to provide the above connecting assembly in which the lower section of the tenon is arched so that it can be easily guided into the mortise to achieve a reliable connecting strength.

The present invention can be best understood through the following description and accompanying drawings, wherein:

DETAILED DESCRIPTION OF THE PREFERRED EMBODIMENT

Figure 1:
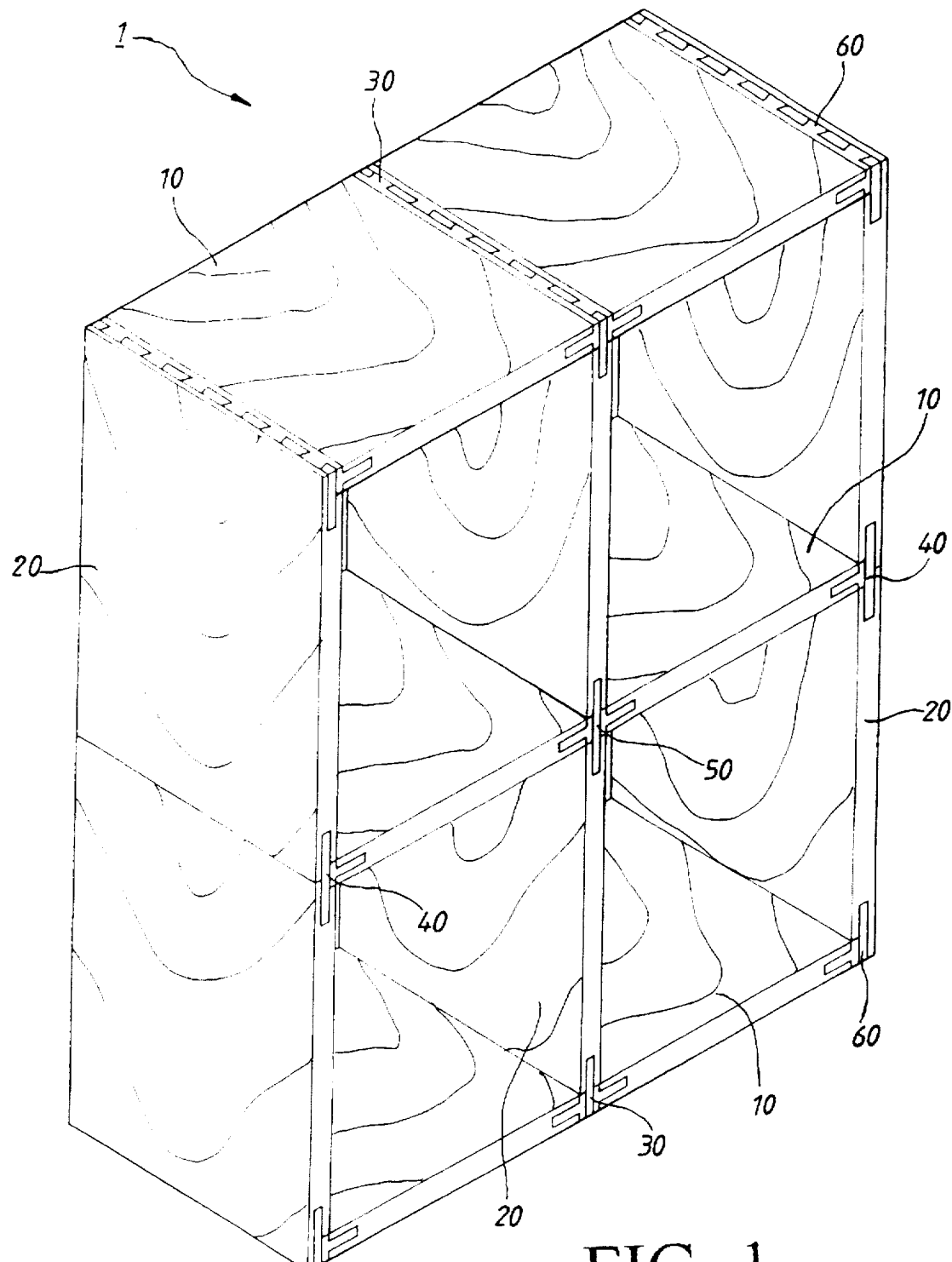
FIG. 1 is a perspective assembled view of the present invention.
Figure 2:
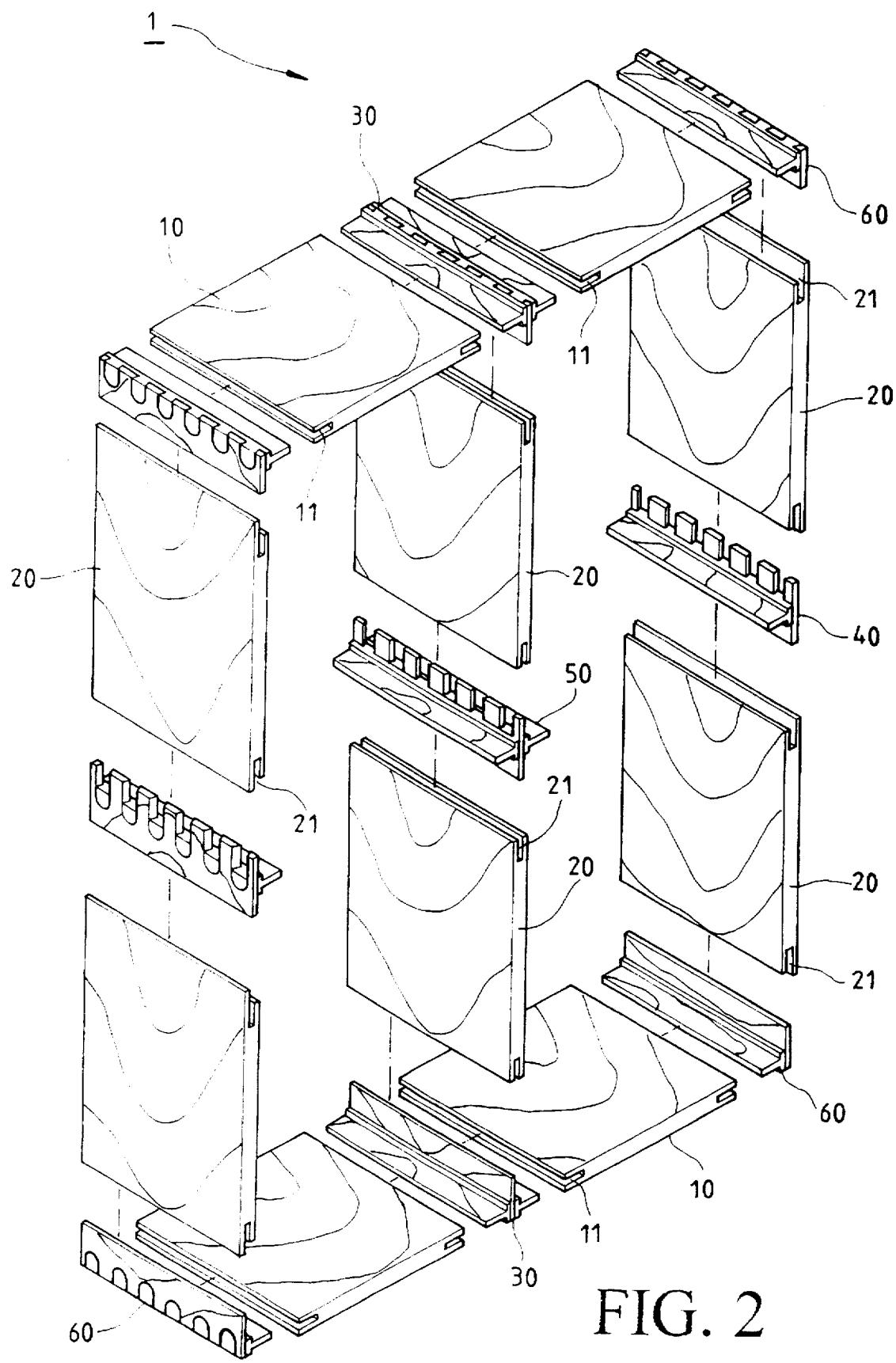
FIG. 2 is a perspective disassembled view of the present invention.

Please refer to FIGS. 1 and 2. The cabinet 1 of the present invention is composed of horizontal boards 10, wall boards 20, upper T-blocks 30, lateral T-blocks 40, inner cross-blocks 50 and L-shaped corner blocks 60. Each of the horizontal boards 10 and wall boards 20 is formed with clamping channels 11, 21 along lateral sides.

Figure 3:
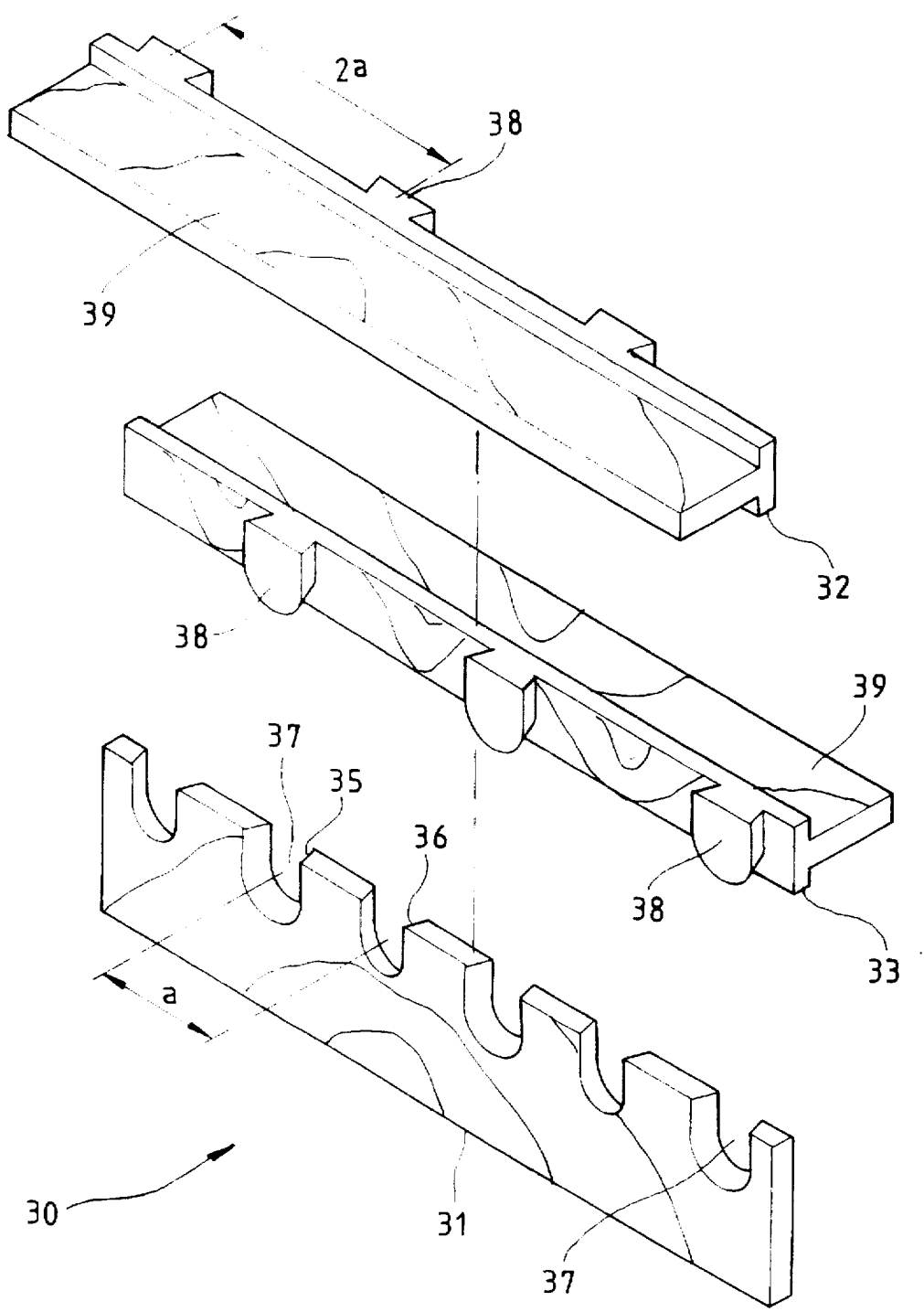
FIG. 3 is a perspective disassembled view of the upper T-block of the present invention.

Referring to FIGS. 2 to 6, the upper T-block 30 includes a vertical slat 31 and two horizontal slats 32, 33 one horizontal slat extending from each opposite side of the vertical slat. The upper side of the vertical slat 31 is formed with multiple shallow dovetail notches 37 which have reversely inclined faces 35, 36 and which are interlaced at equal intervals. One side of the horizontal slats 32, 33 is respectively formed with multiple dovetail tenons 38, which are spaced from each other by a distance double that of the dovetail notches 37. The other side of the horizontal slat is disposed with a thin panel 39 with a thickness equal to that of the clamping channels 11, 21 as shown in FIG. 3.

Figure 4:
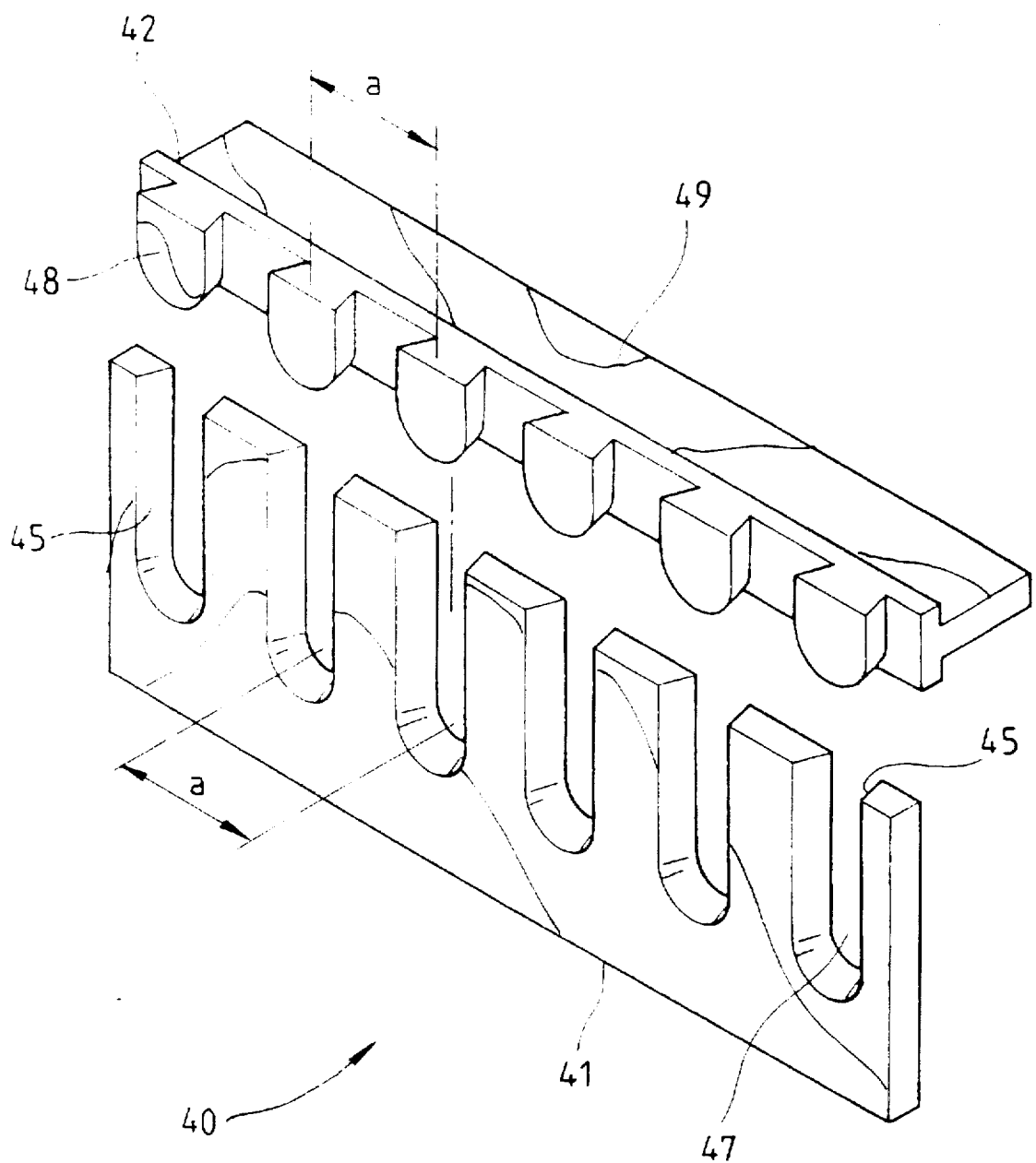
FIG. 4 is a perspective disassembled view of the lateral T-block of the present invention.

The lateral T-block 40 includes a vertical slat 41 and a horizontal slat 42. The upper side of the vertical slat 41 is formed with multiple deep dovetail notches 47 which have inclined faces 45 and which are spaced from each other by a certain distance. Each dovetail notch 47 extends from the upper edge downward to the central section of the vertical slat 41. The horizontal slat 42 is formed with multiple dovetail tenons 48 on one side, which are spaced from each other by a distance equal to that of the dovetail notches 47. The other side of the horizontal slat is disposed with a thin panel 49 with a thickness equal to that of the clamping channels 11, 21 as shown in FIG. 4.

Figure 5:
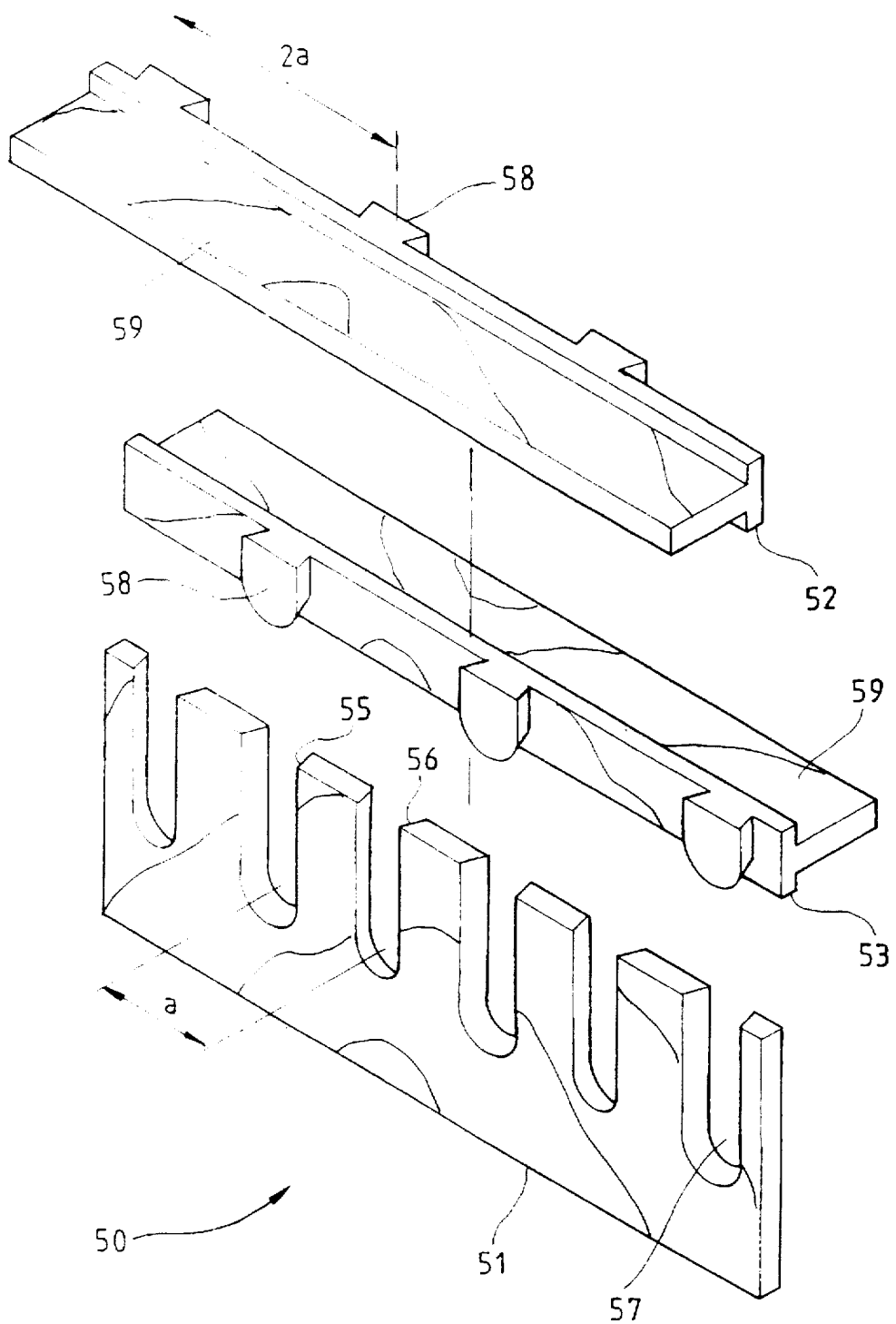
FIG. 5 is a perspective disassembled view of the inner cross-block of the present invention.
Figure 6:
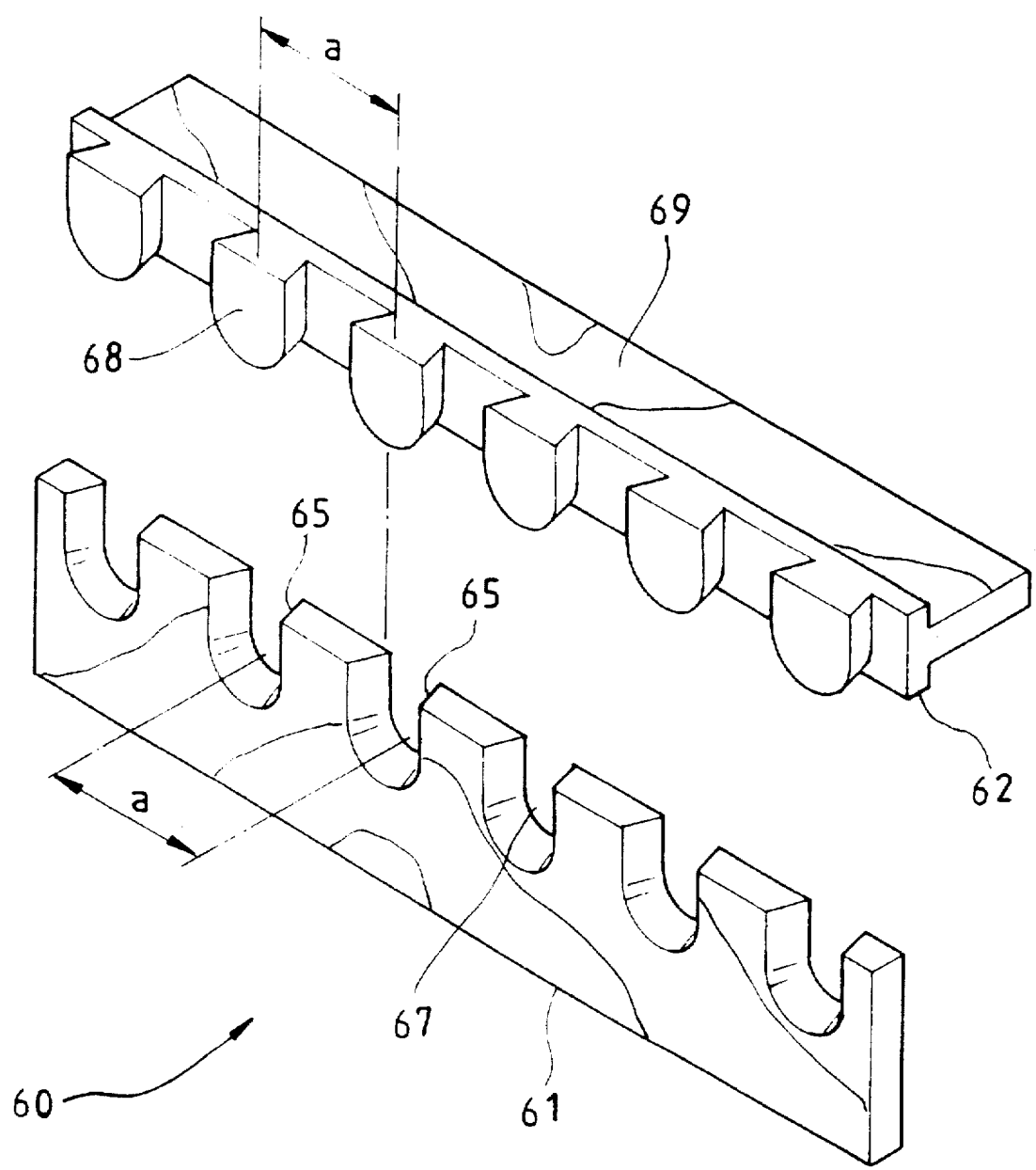
FIG. 6 is a perspective disassembled view of the L-shaped corner block of the present invention.

The inner cross-block 50 includes a vertical slat 51 and two horizontal slats 52, 53 one horizontal slat extending from each opposite side of the vertical slat. The upper side of the vertical slat 51 is formed with multiple shallow dovetail notches 57 which have reversely inclined faces 55, 56 and which are interlaced at equal intervals. One side of the horizontal slats 52, 53 is respectively formed with multiple dovetail tenons 58, which are spaced from each other by a distance double that of the dovetail notches 57. The other side of the horizontal slat is disposed with a thin panel 59 with a thickness equal to that of the clamping channels 11, 21 as shown in FIG. 5. The structure of the cross-block is similar to that of the upper T-block 30. The only difference therebetween is that the cross-block has deeper dovetail notch 57 extending to the central section of the vertical slat 51.

The L-shaped corner block 60 includes a vertical slat 61 and a horizontal slat 62. The upper side of the vertical slat 61 is formed with multiple shallow dovetail notches 67 which have inclined faces 65 and which are spaced from each other by a certain distance. The horizontal slat 62 is formed with multiple dovetail tenons 68 on one side, which are spaced from each other by a distance equal to that of the dovetail notches 67. The other side of the horizontal slat is disposed with a thin panel 69 with a thickness equal to that of the clamping channels 11, 21.

According to the above arrangement, the vertical slat has deep and shallow dovetail notches which have reversely inclined faces 35, 36 or inclined faces 45, while the horizontal slat has corresponding dovetail tenons spaced from each other by a distance equal to or double that of the dovetail notches. Therefore, the simple block members can be inserted with each other to form the upper T-block, lateral T-block, inner cross-block and L-shaped corner block. These block members can be inserted into the clamping channels of the horizontal board and wall board to easily and detachably assemble the same into the cabinet. The assembly can be done in the working site. During transferring, the cabinet can be disassembled into separate block members for easy carriage.

It should be noted that the above description and accompanying drawings are only used to illustrate one embodiment of the present invention, not intended to limit the scope thereof. Any modification of the embodiment should fall within the scope of the present invention.

What is claimed is:

1. A connecting assembly for horizontal boards and wall boards of a cabinet, wherein:

each of the horizontal boards and wall boards is formed with clamping channels along lateral sides, the connecting assembly comprising: upper T-blocks, lateral T-blocks, inner cross-blocks and L-shaped corner blocks each of which is formed by a vertical slat and at least one horizontal slat inserted therewith, one edge of the vertical slat being formed with one of shallow or deep dovetail notches at equally spaced intervals, the dovetail notches having one of reversely inclined interlaced faces and or inclined faces, the horizontal slat having corresponding dovetail tenons spaced from each other by one of a distance equal to or double that of the space between the dovetail notches.

2. A connecting assembly as claimed in claim 1, wherein the upper T-block includes a vertical slat and a horizontal slat extending from two opposite sides of the vertical slat, an upper side of the vertical slat being formed with multiple shallow dovetail notches which have reversely inclined faces and which are interlaced at equal intervals, one side of each of the horizontal slats being formed with multiple dovetail tenons which are spaced from each other by a distance double that of the space between the dovetail notches.

3. A connecting assembly as claimed in claim 1, wherein the lateral T-block includes a vertical slat and a horizontal slat, an upper side of the vertical slat being formed with multiple deep dovetail notches which have inclined faces and which are spaced from each other, the horizontal slat being formed with multiple dovetail tenons on one side, which are spaced from each other by a distance equal to that of the space between the dovetail notches.

4. A connecting assembly as claimed in claim 1, wherein the inner cross-block includes a vertical slat and a horizontal slat extending from two opposite sides of the vertical slat, an upper side of the vertical slat being formed with multiple deep dovetail notches which have reversely inclined faces and which are interlaced at equal intervals, one side of the horizontal slats being respectively formed with multiple dovetail tenons which are spaced from each other by a distance double that of the space between the dovetail notches.

5. A connecting assembly as claimed in claim 1, wherein the L-shaped corner block includes a vertical slat and a horizontal slat, an upper side of the vertical slat being formed with multiple shallow dovetail notches which have inclined faces and which are spaced from each other, the horizontal slat being formed with multiple dovetail tenons on one side, which are spaced from each other by a distance equal to that of the space between the dovetail notches.

* * * * *